United States Patent Office  3,249,620
Patented May 3, 1966

3,249,620
N-TRIHALOGENO METHYL THIO-DERIVATIVES OF 5 RING MEMBERS CONTAINING HETEROCYCLIC COMPOUNDS
Engelbert Kühle, Cologne-Stammheim, Erich Klauke, Cologne-Flittard, Ferdinand Grewe, Cologne-Stammheim, and Helmut Kaspers, Leverkusen, Germany, assignors to Farbenfabriken Bayer Aktiengesellschaft, Leverkusen, Germany, a corporation of Germany
No Drawing. Filed Aug. 22, 1962, Ser. No. 218,505
Claims priority, application Germany, Aug. 26, 1961, F 34,792
10 Claims. (Cl. 260—304)

The present invention relates to and has as its objects new and useful fungicidally active compounds of the general formula

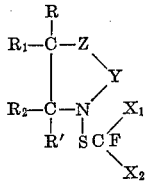

in which $R_1$ and $R_2$ stand for hydrogen or an optionally substituted aliphatic or aromatic radical; moreover $R_1$ and $R_2$ can also be attached to a condensed and optionally substituted arylene radical; R and R' stand for hydrogen or an additional C—C linkage; Y represents a carbonyl group and Z an oxygen or sulphur atom or a further carbonyl group or the grouping =N—$R_3$, $R_3$ being hydrogen or an alkyl radical; Y and Z can furthermore stand together for an —N=N— group. The radicals $X_1$ and $X_2$ represent chlorine, bromine and/or fluorine.

This invention also relates to improvements in fungicidal preparations and more specifically to improved fungicides as well as to methods of protecting organic material against the attack of fungi.

Furthermore the invention is concerned with a method for the synthesis of the new suphenic acid derivatives of the formula as given above.

In the earlier copending application Serial No. 148,845, filed October 31, 1961, there are already described N-thiomonofluoro-dichloromethyl imides of the general formula

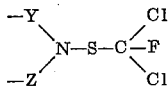

in which Y and Z represent CO— and/or $SO_2$— groups, which are further linked with a similar or different organic radical, an optionally substituted amino group or a common organic radical (with ring coupling); and Z can moreover stand for an organic radical, which is linked to the nitrogen atom optionally via a further heteroatom, and a process for the production of sulphenic acid derivatives, characterized in that compounds of the general formula

wherein Y and Z have the same significance as given above are reacted with dichlorofluoromethane sulphenic acid chloride.

Furthermore the objects of copending application Serial No. 186,360, filed April 10, 1962 are compounds of the general formula

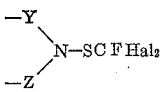

in which the symbols Y and Z have the above-mentioned significance, and a process for the production of these sulphenic acid derivatives, in which compounds of the general formula

in which Y and Z have the aforesaid significance and X represents hydrogen or a cation, are reacted with halogenated fluoromethane sulphenic acid halides of the general formula

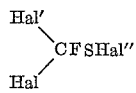

In the last-named formula Hal represents chlorine, bromine or fluorine, Hal' stands for bromine or fluorine and Hal" is chlorine or bromine.

The sulphenic acid derivatives described in the above mentioned patent specifications are distinguished by an outstanding fungicidal activity combined with a good plant tolerance and likewise possess a high initial as well as a long-lasting effect. By virtue of these properties the products represent valuable plant protection and pest control agents, mainly fungicides.

In accordance with the present invention it has now been found that sulphenic acid derivatives of the formula

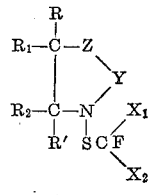

are fungicidally highly effective products and therefore are particularly suitable for controlling the growth of fungi.

These new compounds are obtained, if compounds of the general formula

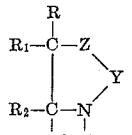

are reacted with sulphenic acid halides of the formula

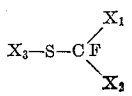

In the last mentioned formulae $R_1$ and $R_2$ stand for hydrogen or an optionally substituted aliphatic or aromatic radical; moreover $R_1$ and $R_2$ can also be attached to a condensed and optionally substituted arylene radical; R and R' stand for hydrogen or an additional C—C linkage; Y represents a carbonyl group and Z an oxygen or sulphur atom or a further carbonyl group or the grouping $=N-R_3$, $R_3$ being hydrogen or an alkyl radical; Y and Z can furthermore stand together for an $-N=N$ group. The radicals $X_1$ and $X_2$ represent chlorine, bromine and/or fluorine and the radicals $X_3$ chlorine or bromine.

The inventive process may be illustrated in more detail by way of the following schematic formulae:

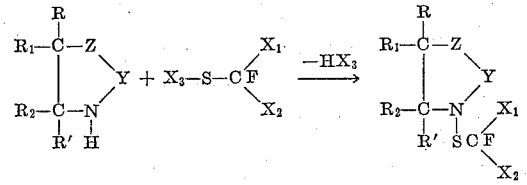

This reaction scheme is only given for the purpose of illustrating the invention and is not intended to limit it in any way.

In the foregoing equation the symbols R, R', $R_1$, $R_2$, $X_1$, $X_2$ $X_3$, and Y and Z have the last mentioned significance.

As starting materials suitable for the process according to the invention there may be mentioned for example the following heterocyclic compounds: isatin, 5,7-dichloro or 5-bromisatin, benzoxazolone-(2), 5-chlorobenzoxazolone-(2), benzthiazolone-(2), 3-methyl- and 3-dodecyl-benzimidazolene-(2), benztriazole, oxazolidone-(2), ethylene urea and others.

Among the halogenated fluoromethane sulphenic acid halides of the general formula as given above further required as starting materials for the reaction according to the inventive process there may for example be used: fluorodichloro- and difluorochloromethane sulphenic acid chloride, or trifluoro-, bromofluorochloro- and dibromofluoromethane sulphenic acid bromide. The two first named halomethanesulphenic acid chlorides are already described in the literature (Z. obsc. Chim. 29, pp. 2163 and 3402 (1959)), while the dibromofluoromethane sulphenic acid bromide can be produced in a manner analogous to the instructions of the German patent specification 1,058,-502 from dichlorofluoromethane sulphenic acid chloride by reaction with aqueous hydrobromic acid.

The reaction for preparing the inventive compounds generally is carried out at room temperature or slightly elevated temperatures either in an aqueous alkaline medium or in an inert organic solvent such as benzene, chlorobenzene, carbon tetrachloride or dioxan and in the presence of acid binding agents i.e. alkali hydroxides, -alcoholates, -carbonates or tertiary amines.

As already mentioned above the compounds according to the present invention possess outstanding fungicidal properties; they are therefore intended to be applied as plant protection and particularly as fungus combating agents.

A great advantage of the inventive sulphenic acid derivatives is their good plant tolerance, especially regarding phytotoxicity without decreasing of the fungicidal activity. Moreover the compounds according to the invention show an excellent long-lasting action and stability.

From the following experiment there is to be seen the high initial activity of the inventive compounds. The test is a green-house experiment and has been carried out with tomato plants (Bonny Best). Aqueous emulsions of the compounds shown in the table below have been prepared by admixing the active ingredient with the same amount of dimethyl formamide and a commercial nonionic emulsifier (NP10). Plants sprayed with these solutions are inoculated after 24 hours with Zoosporangia of *Phytophthora infestans*, and placed in humidity chambers at a temperature of 20° C. and a relative humidity of 100%. They are kept there for 5 days. After that the infestation has been checked and is shown in the table below in comparision to an untreated control test, infestation of which is set as 100.

| Compound | Degree of infestation by *Phytophthora infestans* (in percent) at a concentration of active ingredient (aqueous emulsion) of— | | |
|---|---|---|---|
| | 0.1% | 0.025% | 0.0062% |
| benzotriazole-SCFCl₂ | ---------- | 44 | 65 |
| benzoxazolone-SCFCl₂ | 5 | 40 | ---------- |
| 5-chlorobenzoxazolone-SCFCl₂ | 19 | 43 | ---------- |
| 5-nitrobenzoxazolone-SCFCl₂ | ---------- | 63 | ---------- |
| benzthiazolone-SCFCl₂ | ---------- | 56 | ---------- |
| benzimidazolone-SCFCl₂ | ---------- | 8 | 38 |
| isatin-SCFCl₂ | ---------- | 43 | 51 |
| 3-methylbenzimidazolone-SCFCl₂ | ---------- | 12 | 43 |
| Control (untreated) | 100 | ---------- | ---------- |

The following examples are given for the purpose of illustrating the invention:

*Example 1*

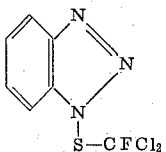

Into a solution of 13 g. of benztriazole and 13 g. of triethylamine in 100 ml. of diethyl ether, 18.5 g. of fluorodichloromethane sulphenic acid chloride are added dropwise with external cooling of the mixture at room temperature. The reaction mixture is then after-stirred for a short time, the separated triethylammonium-hydrochloride then filtered off with suction and the filtrate concentrated. There are obtained 20 g. of the product of the above formula in the form of a viscous oil.

By exactly the same methods there may be produced the following compounds:

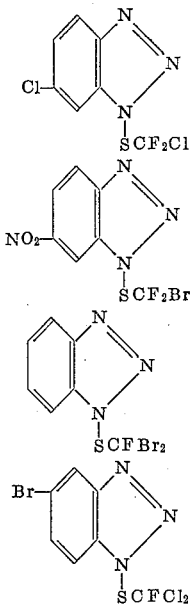

Example 2

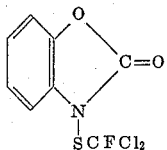

27 g. of benzoxazole-(1,3)-one-(2) are dissolved with addition of 8 g. of sodium hydroxide in 200 ml. of water and this solution is treated dropwise, while cooling at 15 to 20° C., with 24 g. of fluorodichloromethane sulphenic acid chloride. After subsequent brief stirring of the mixture, the reaction product is filtered off with suction, which, recrystallized from acetonitrile, melts at 73° C. In an analogous manner the following compounds are obtained:

| Constitution | Melting Point [° C.] |
|---|---|
| Cl—[benzoxazolone]—SCFl$_2$ | 96 |
| NO$_2$—[benzoxazolone]—SCFCl$_2$ | 137 |
| [benzothiazolone]—SCFCl$_2$ | 87 to 89 |
| CH$_3$—[benzoxazolone]—SCF$_2$Cl | |
| Cl—[benzoxazolone]—SCFCl$_2$ | |
| NO$_2$—[benzothiazolone]—SCFCl$_2$ | |
| Br—[benzothiazolone]—SCFBrCl | |
| Br—[benzoxazolone]—SCFCl$_2$ | |

Example 3

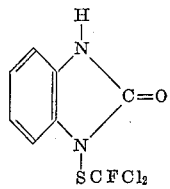

A solution of 26.8 g. of benzimidazole-(1,3)-one (2) and 34 g. of fluorodichloromethane sulphenic acid chloride in 200 ml. of dioxan is treated dropwise at room temperature with 22 g. of triethylamine. The temperature of the mixture rises to about 40° C. After brief stirring of the reaction mixture the latter is taken up in water, whereby the product of the above formula separates immediately in a crystalline form. The yield amounts to 42 g.; the melting point of the compound lies at 159 to 163° C.

In the same way there may be produced the following compounds:

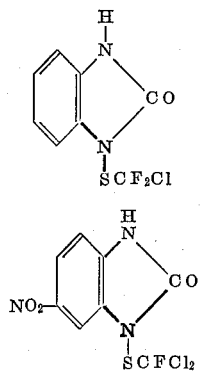

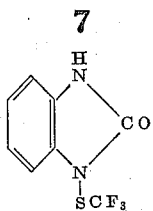
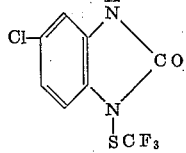

Example 4

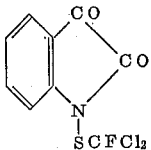

To a mixture of 29.4 g. of isatin, 22 g. of triethylamine and 200 ml. of dioxan, there are added dropwise 34 g. of fluorodichloromethane sulphenic acid chloride, whereby the temperature of the reaction mixture rises to about 35° C. The latter is stirred for a short time and upon addition of water there are obtained 33 g. of the reaction product of the above formula and of melting point 116 to 119° C.

By exactly the same methods there may be obtained the following compounds:

|  | Melting Point [° C.] |
|---|---|
|  | 140 to 141 |
|  | 143 to 144 |
|  | |
| 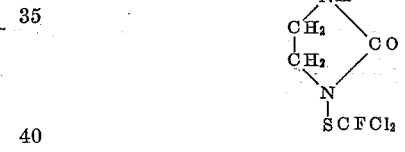 | |
| 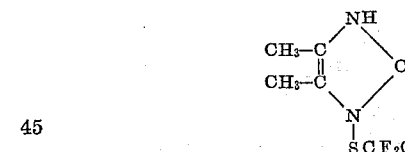 | |
| 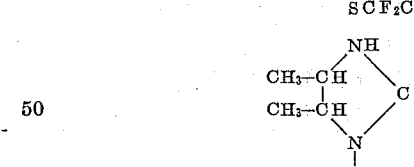 | |
|  | |

Example 5

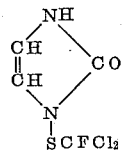

17 g. of ethylene urea and 34 g. of fluorodichloromethane sulphenic chloride are suspended or dissolved in 200 ml. of dioxane. Upon the dropwise addition of 21 g. of triethylamine dissolved in 50 ml. of dioxan, the temperature of the mixture rises to 40° C. The triethylammonium hydrochloride which separates is filtered off with suction and the filtrate is concentrated in a vacuum. As residue, 33 g. of the product of the above constitution are obtained in the form of a brownish oil.

In the same manner there may be obtained the following compounds:

Example 6

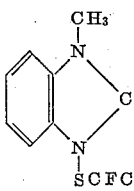

A mixture of 14.8 g. 1-methylbenzimidazol-(1,3)-one-(2) an 140 ml. of dioxane is treated first with 17 g. of fluorodichloromethane sulphenic acid chloride and subsequently at room temperature with a solution of 10 g. of triethylamine in 40 ml. of dioxane. The temperature of the mixture rises to 35° C. Thereafter, the reaction mixture is stirred for some time, the triethylammonium hydrochloride obtained as a by-product is filtered off while cooling the mixture and the filtrate concentrated in vacuum. As residue there is obtained the compound of the above formula. Recrystallized from washing benzene the product melts at 102° C.

In an analogous manner there are obtained the following compounds:

| Constitution | Melting point [° C.] |
|---|---|
| 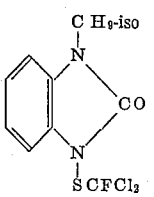 | 84–86 |
| 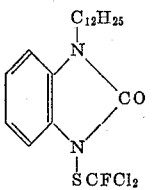 | Oily |
| 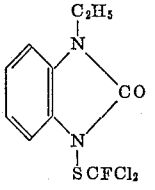 | |
| 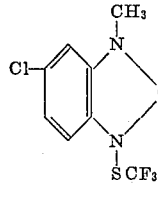 | |
| 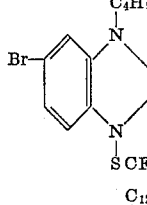 | |
| 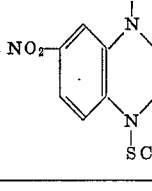 | |

We claim:
1. A compound of the formula

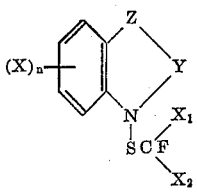

wherein X is a member selected from the group consisting of hydrogen, halogen, nitro, and alkyl of 1–4 carbon atoms; $n$ is an integer of 0–2; $X_1$ and $X_2$ are members selected from the group consisting of chlorine, bromine, and fluorine; Y is carbonyl; and Z is a member selected from the group consisting of —O—, —S—,

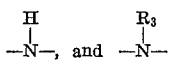

wherein $R_3$ is alkyl of 1–12 carbon atoms.

2. A sulphenic acid compound of the formula

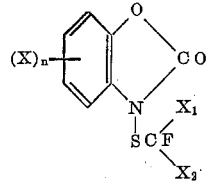

in which X stands for a member selected from the group consisting of hydrogen, halogen, nitro and lower alkyl having up to 4 carbon atoms; $n$ stands for an integer of 0–2 and $X_1$ and $X_2$ stand for a member selected from the group consisting of chlorine, bromine and fluorine.

3. A sulphenic acid compound of the formula

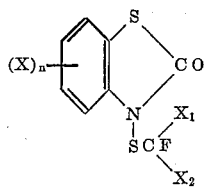

in which X stands for a member selected from the group consisting of hydrogen, halogen, nitro and lower alkyl having up to 4 carbon atoms; $n$ stands for an integer of 0–2 and $X_1$ and $X_2$ stand for a member selected from the group consisting of chlorine, bromine and fluorine.

4. A sulphenic acid compound of the formula

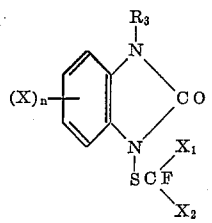

in which X stands for a member selected from the group consisting of hydrogen, halogen, nitro and lower alkyl having up to 4 carbon atoms; $n$ stands for an integer of 0–2 and $X_1$ and $X_2$ stand for a member selected from the group consisting of chlorine, bromine and fluorine and in which $R_3$ stands for a member selected from the group consisting of hydrogen and alkyl groups up to 12 carbon atoms.

5. The compound of the formula

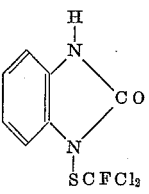

6. The compound of the formula

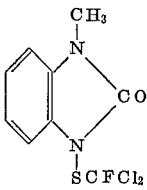

7. The compound of the formula

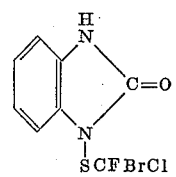

8. The compound of the formula

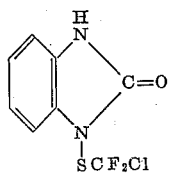

9. The compound of the formula

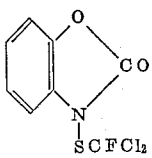

10. The compound of the formula

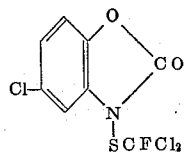

References Cited by the Examiner

UNITED STATES PATENTS

| | | | |
|---|---|---|---|
| 2,553,775 | 5/1951 | Hawley et al. | 260—309.5 |
| 2,657,169 | 10/1953 | Ligett et al. | 167—33 |
| 2,863,802 | 12/1958 | Pyne | 167—33 |
| 2,922,794 | 1/1960 | Model et al. | 260—307.3 |
| 2,974,085 | 3/1961 | Bartels et al. | 260—307.3 |
| 3,036,088 | 5/1962 | Harris | 260—306.7 |

FOREIGN PATENTS 209,339  5/1960  Austria.

OTHER REFERENCES

Rhone Poulenc Derwent Belgian Patents Report No. 88 B, page 4 of Section 3 (pharmaceuticals, Photographic), Belgium Patent 608,930 (report issued May 25, 1962).

WALTER A. MODANCE, *Primary Examiner.*

NICHOLAS S. RIZZO, *Examiner.*